(12) United States Patent
     Crouch (10) Patent No.: US 11,185,821 B2
(45) Date of Patent: Nov. 30, 2021

(54) PROCESS AND SYSTEM FOR SUPPLYING A LOW SALINITY INJECTION WATER

(71) Applicant: BP Exploration Operating Company Limited, Middlesex (GB)

(72) Inventor: John Henry Crouch, Odell (GB)

(73) Assignee: BP EXPLORATION OPERATING COMPANY LIMITED, Middlesex (GB)

( * ) Notice: Subject to any disclaimer, the term of this patent is extended or adjusted under 35 U.S.C. 154(b) by 50 days.

(21) Appl. No.: 16/491,250

(22) PCT Filed: Mar. 26, 2018

(86) PCT No.: PCT/EP2018/057655
    § 371 (c)(1),
    (2) Date: Sep. 5, 2019

(87) PCT Pub. No.: WO2018/178019
    PCT Pub. Date: Oct. 4, 2018

(65) Prior Publication Data
    US 2020/0009506 A1    Jan. 9, 2020

(30) Foreign Application Priority Data
    Mar. 28, 2017  (EP) ................................. 17163422

(51) Int. Cl.
    *B01D 61/02*    (2006.01)
    *B01D 61/58*    (2006.01)

(52) U.S. Cl.
    CPC ......... *B01D 61/022* (2013.01); *B01D 61/025* (2013.01); *B01D 61/027* (2013.01);
    (Continued)

(58) Field of Classification Search
    CPC combination set(s) only.
    See application file for complete search history.

(56) References Cited

U.S. PATENT DOCUMENTS

2013/0313195 A1    11/2013  Townsend et al.
2017/0173533 A1*    6/2017  Wang ...................... C02F 1/008

FOREIGN PATENT DOCUMENTS

GB        2395946 A        6/2004
WO     2007/138327 A1     12/2007
                  (Continued)

OTHER PUBLICATIONS

PCT/EP2018/057655 International Search Report and Written Opinion dated Apr. 26, 2018 (14p.).
(Continued)

*Primary Examiner* — Krishnan S Menon
(74) *Attorney, Agent, or Firm* — Conley Rose, P.C.

(57) ABSTRACT

A desalination system includes a feed pump having an inlet side and an outlet side. In addition, the system includes a first RO stage having an inlet, RO permeate outlet and RO concentrate outlet. Further, the system includes a second RO stage having an inlet, RO permeate outlet and RO concentrate outlet and an NF stage having an inlet, NF permeate outlet and an NF concentrate outlet. The system also includes a set of conduits adapted to connect: (a) the outlet side of the feed pump to the inlet of the first RO stage; (b) the concentrate outlet of the first RO stage to (i) the inlet of the second RO stage and to the inlet of the NF stage; and (c) the permeate outlet of the first RO stage, the permeate outlet of the second RO stage and the permeate outlet of the NF stage either directly or indirectly to a low salinity water injection line.

15 Claims, 2 Drawing Sheets

(52) U.S. Cl.
CPC .......... *B01D 61/58* (2013.01); *B01D 2311/06* (2013.01); *B01D 2311/25* (2013.01); *B01D 2317/022* (2013.01)

(56) References Cited

FOREIGN PATENT DOCUMENTS

| WO | 2008/029124 A1 | 3/2008 |
| WO | 2011/086346 A1 | 7/2011 |
| WO | 2012/138502 A1 | 10/2012 |
| WO | 2014/025847 A1 | 2/2014 |

OTHER PUBLICATIONS

European Office Action dated Mar. 22, 2021, for European Application No. 18711982.1.

* cited by examiner

PROCESS AND SYSTEM FOR SUPPLYING A LOW SALINITY INJECTION WATER

CROSS-REFERENCE TO RELATED APPLICATIONS

This application is a 35 U.S.C. § 371 national stage application of PCT/EP2018/057655 filed Mar. 26, 2018 and entitled "Process and System for Supplying a Low Salinity Injection Water," which claims priority to European Application No. 17163422.3 filed Mar. 28, 2017 and entitled "Process and System for Supplying a Low Salinity Injection Water," each of which is hereby incorporated herein by reference in its entirety for all purposes.

STATEMENT REGARDING FEDERALLY SPONSORED RESEARCH OR DEVELOPMENT

Not applicable.

TECHNICAL FIELD

The present invention relates to a process for providing a low salinity injection water for an oil reservoir having a controlled salinity for avoidance of formation damage and a sufficiently low sulfate anion concentration to avoid souring of the reservoir, and to a desalination system for producing such an injection water.

BACKGROUND

As described in International patent application WO 2008/029124, it is known to inject water of low salinity into an oil-bearing formation of a reservoir in order to enhance the recovery of oil from the reservoir.

A problem associated with low salinity water-flooding is that desalination techniques may yield water having a lower than optimal salinity for continuous injection into an oil bearing reservoir. Indeed, the desalinated water may be damaging to the oil-bearing rock formation of the reservoir and may inhibit oil recovery, for example, by causing swelling of clays in the formation. Thus, there is an optimal salinity for the injection water that provides the benefit of enhanced oil recovery whilst mitigating the risk of formation damage, and, the optimum value may vary from formation to formation. Typically, where an oil-bearing formation comprises rock that contains high levels of swelling clays, formation damage may be avoided, while still releasing oil from the formation, when the injection water has a total dissolved solids content (TDS) in the range of 500 to 5,000 ppm, preferably, 500 to 3,000, in particular 1,000 to 2,000 ppm.

However, it is not desirable to mix a desalinated water of low multivalent cation and multivalent anion content with an untreated high salinity water such as seawater owing to the high sulfate anion and multivalent cation contents of the untreated high salinity water and the presence of trace elements and nutrients in the untreated high salinity water. Thus, the high sulfate anion content of such a mixed water stream and the presence of trace elements and nutrients in the mixed water stream may result in proliferation of sulfate reducing bacteria and hence reservoir souring. Further, the high multivalent cation content of the mixed water stream may result in the precipitation of unacceptable levels of insoluble mineral salts (scale formation) when the injected water contacts precipitate precursor cations such as barium, strontium and calcium cations that are commonly present in the connate water of the formation. In addition, mixing of desalinated water with a high salinity water such as seawater may result in the mixed water stream containing unacceptable levels of multivalent cations, in particular, calcium and magnesium cations. Thus, in order to achieve incremental oil recovery with a low salinity injection water, the ratio of the concentration of multivalent cations in the low salinity injection water to the concentration of multivalent cations in the connate water of the reservoir should be less than 1, preferably, less than 0.9, more preferably, less than 0.8, in particular, less than 0.6, for example, less than 0.5.

International patent application publication number WO 2011/086346 relates to a process for producing an injection water stream of controlled salinity and controlled sulfate anion concentration that is suitable for injection into an oil bearing formation of an oil reservoir, the process comprising the steps of:

feeding a source water having a total dissolved solids content in the range of 20,000 to 45,000 ppm and a sulfate anion concentration in the range of 1,000 to 4,000 ppm, preferably, 1,500 ppm to 4,000 ppm to a desalination plant that comprises a plurality of reverse osmosis (RO) membrane units and a plurality of nanofiltration (NF) membrane units wherein the source water is pressurized to a pressure in the range of 350 to 1250 psi absolute, and dividing the source water to provide a feed water for the RO membrane units (hereinafter "RO feed water") and a feed water for the NF membrane units (hereinafter "NF feed water");

if necessary, increasing the pressure of the RO feed water to a value in the range of 900 to 1250 psi absolute before introducing the RO feed water to the RO membrane units and withdrawing an RO permeate and an RO retentate from the RO membrane units wherein the RO membrane units are operated in either a single-pass, single-stage mode or in a single-pass, two-stage mode and wherein the recovery of RO permeate is in the range of 35 to 75% by volume, preferably, 35 to 60% by volume based on the volume of the RO feed water that is fed to the RO membrane units such that the RO permeate has a total dissolved solids contents of less than 250 ppm, and a sulfate anion concentration of less than 3 ppm;

if necessary, reducing the pressure of the NF feed water to a value in the range of 350 to 450 psi absolute before introducing the NF feed water to the NF membrane units and withdrawing an NF permeate and an NF retentate from the NF membrane units wherein the NF membrane units are operated in a single-pass, single-stage mode and wherein the NF membrane units are operated with a recovery of NF permeate in the range of 35 to 60% by volume based on the volume of the NF feed water that is fed to the NF membrane units such that the NF permeate has a total dissolved solids content in the range of 15,000 to 40,000 ppm, preferably, 15,000 to 35,000 ppm, and a sulfate anion concentration of less than 40 ppm, preferably less than 30 ppm; and mixing at least a portion of the RO permeate and at least a portion of the NF permeate in a ratio in the range of 2:1 to 40:1, preferably, 4:1 to 27:1, in particular, 10:1 to 25:1 to provide an injection water having a total dissolved solids content in the range of 500 to 5,000 ppm, preferably, 1,000 to 5,000 ppm, and a sulfate anion concentration of less than 7.5 ppm, preferably, less than 5 ppm, more preferably less than 3 ppm.

However, a problem arises offshore in that there is limited space on a platform or floating production and offloading (FPSO) unit such that it would be desirable to reduce the number of NF units in an NF stage of a membrane desalination plant thereby reducing the footprint and weight of the plant.

SUMMARY

In a first embodiment, the present invention relates to a desalination system comprising:
a feed pump having an inlet side and an outlet side;
a first RO stage having an inlet, RO permeate outlet and RO concentrate outlet;
a second RO stage having an inlet, RO permeate outlet and RO concentrate outlet; and,
an NF stage having an inlet, NF permeate outlet and an NF concentrate outlet; and,
a set of conduits adapted to connect:
(a) the outlet side of the feed pump to the inlet of the first RO stage;
(b) the concentrate outlet of the first RO stage to (i) the inlet of the second RO stage and (ii) to the inlet of the NF stage; and
(c) the permeate outlet of the first RO stage, the permeate outlet of the second RO stage and the permeate outlet of the NF stage either directly or indirectly to a low salinity water injection line.

In a second embodiment, the present invention relates to a process for treating a feed water comprising the steps of:
flowing a feed water through a first stage of reverse osmosis (RO) filtration to produce a first stage RO permeate and a first stage RO concentrate;
flowing a first portion of the RO concentrate through a second stage of RO filtration to produce a second stage RO permeate and a second stage RO concentrate; and,
flowing a second portion of the first stage RO concentrate through a nanofiltration (NF) stage to produce an NF permeate and an NF concentrate;
and of combining the first stage RO permeate, second stage RO permeate and the NF permeate to form a low salinity injection water stream.

Suitably, the low salinity injection water stream is injected into an oil-bearing reservoir. Typically, the oil-bearing reservoir is penetrated by at least one injection well and at least one production well. The low salinity injection water stream may be injected into the reservoir from the injection well(s) and sweeps oil through the reservoir towards the associated production well(s) from which the oil is recovered. Optionally, a slug of low salinity injection water may be injected into the injection well(s) having a pore volume in the range of 0.3 to 0.9, preferably, 0.4 to 0.7, based on the swept pore volume between the injection well and its associated production well(s). Following injection of the slug of low salinity injection water, a drive water may be injected into the injection well (for example, seawater, estuarine water, high salinity produced water, high salinity aquifer water or mixtures thereof) to drive the low salinity water and hence the oil towards the production well.

DEFINITIONS

Throughout the following description the following terms are referred to:

"Feed water" is the water fed to the first RO stage of the desalination system.
"Produced water" is water separated from oil and gas at a production facility.
The unit "ppmv" is "parts per million on a volume of water basis" and is equivalent to the unit "mg/L".
"Reverse osmosis membrane element" is a filtration element comprising a reverse osmosis (RO) membrane.
"Nanofiltration membrane element" is a filtration element comprising a nanofiltration (NF) membrane.
A "reverse osmosis (RO) filtration unit" comprises a pressure vessel, alternatively called a housing, containing one or more RO membrane elements, preferably, between 1 and 8 RO membrane elements, in particular, between 4 and 8 RO membrane elements.
A "nanofiltration (NF) filtration unit" comprises a pressure vessel containing one or more NF elements, preferably between 1 and 8 membrane elements, in particular, between 4 and 8 NF membrane elements.
The "pressure vessel" of the RO or NF filtration unit is typically a cylindrically shaped vessel having a cylindrical wall (i.e., a cylinder), and first and second end caps arranged at first and second ends of the cylinder.
A "reverse osmosis (RO) stage of a desalination system" is a group of RO filtration units connected together in parallel. Similarly, a "nanofiltration (NF) stage of a filtration system" is a group of NF filtration units connected together in parallel.
A "membrane block" comprises stages of RO and NF filtration connected together to provide concentrate staging and typically shares common valving and piping. A membrane block or two or more membrane blocks may be mounted on a skid.

DETAILED DESCRIPTION

Further features and advantages of the invention will become apparent from the following description of preferred embodiments of the invention.

The desalination system of the present invention comprises at least one membrane block comprising an RO array and an NF array. The RO array comprises at least two RO stages, preferably two or three RO stages. The NF array comprises at least one NF stage, preferably one or two NF stages. The RO stages are connected together so as to provide concentrate staging across the RO stages. The first RO stage is also connected to the NF array to provide concentrate staging across the first RO stage and the NF stage(s) of the NF array.

A pressurized feed water is fed to the first RO stage which separates the feed water into a first stage RO permeate and a first stage RO concentrate. In some contexts, a concentrate can also be referred to as a retentate. The first stage RO concentrate is then divided into a first portion and a second portion to provide an RO feed water for the second RO stage and an NF feed water for the NF array respectively.

Where the NF array has a single stage, the NF feed water is separated into an NF permeate and NF concentrate. The NF concentrate is discharged from the membrane block, e.g., in the case of an offshore desalination system, the NF concentrate is discharged to a body of water via an NF concentrate dump line. Where the NF array has two stages, the first NF stage separates the NF feed water into a first stage NF permeate and first stage NF concentrate. The first stage NF concentrate is then used as feed to the second NF stage which separates the feed into a second stage NF permeate and second stage NF concentrate. The second stage NF concentrate is discharged from the membrane block, e.g., in the case of an offshore desalination system, is discharged to a body of water via an NF concentrate dump line. The first stage NF permeate and second stage NF permeate are then combined to form a combined NF permeate.

The second RO stage separates the first portion of the first stage RO concentrate into a second stage RO permeate and a second stage RO concentrate. Where there are two RO stages, the second stage RO concentrate may be discharged from the membrane block, e.g., in the case of an offshore desalination system, may be dumped overboard via an RO brine dump line.

It is also envisaged that the second stage RO concentrate may flow through a third stage of RO filtration to form a third stage RO permeate and a third stage RO concentrate. Where there are three RO stages, the third stage RO concentrate may be discharged from the membrane block, e.g., in the case of an offshore desalination system, may be dumped overboard via an RO brine dump line. However, it is envisaged that the second stage RO concentrate may be divided to provide an RO feed water for the third RO stage and a feed water that is recycled to the NF array to form an NF feed comprising a blend of the first stage and second stage RO concentrate.

Typically, the first stage RO permeate, second stage RO permeate and the optional third stage RO permeate may be combined to form a combined RO permeate. Where there are two NF stages, the first stage NF permeate and second stage NF permeate may be combined to form a combined NF permeate. The NF permeate (produced by a single stage NF array) or the combined NF permeate (produced by a two stage NF array) and the combined RO permeate may then be blended to form the low salinity injection water. However, the person skilled in the art will understand that the order in which the various permeate streams are blended may be varied. For example, where there are two RO stages and two NF stages, the first stage RO permeate may be combined with the first stage NF permeate, the second stage RO permeate may be combined with the second stage NF permeate and then the two blended streams may be combined to form the low salinity injection water stream.

The person skilled in the art will understand that:
(1) NF membrane elements typically have lower operating pressures than RO membrane elements;
(2) there are pressure drops across each stage of a membrane block; and
(3) pressures and flows through a membrane block may be controlled using one or more pumps and one or more valves (e.g. throttle valves, back-pressure valves or pressure-let down valves).

An advantage of the desalination system of the present invention is that the pressures and flows in the membrane block may be controlled so as to adjust the pressure of the first stage RO concentrate to match the required feed pressure for the NF array. If necessary, the first portion of the first stage RO concentrate (used as feed to the second RO stage) is boosted in pressure to a value at or above the minimum feed pressure for the second RO stage, for example, using a booster pump.

Alternatively, the pressures and flows in the membrane block may be controlled so as to adjust the pressure of the first stage RO concentrate to match the required feed pressure for the second RO stage. For example, this may be achieved by applying a back-pressure on the first stage RO permeate. If necessary, the second portion of first stage RO concentrate (used as feed to the NF array) is reduced in pressure to a value at or below the maximum feed pressure for the NF array.

Where a portion of the second stage RO concentrate is recirculated to the NF array, if necessary, the pressure of the recirculated second stage RO concentrate may be increased to above the minimum feed pressure for the NF array using a booster pump. This would be necessary if the initial pressure of the recirculated second stage RO concentrate is below the desired feed pressure for the NF array, e.g. is below the minimum operating pressure for the NF elements of the NF array.

The desalination system also has valves and conduits to provide the flow paths described above. Thus, the first RO stage of the membrane block additionally comprises a main conduit leading from the concentrate outlet of the first RO stage. This main conduit divides at a branch point to form a feed conduit for the second RO stage and a feed conduit for the NF array. A flow controller may be provided in the main conduit so as to control the division of first stage RO concentrate between the second RO stage and the NF array. The inlet or feed pressure for the NF units of a single stage NF array or of the first stage of a two-stage NF array is preferably in the range of 350 to 450 psi absolute, in particular, 380 to 420 psi absolute, for example, about 400 psi absolute. Where the pressure of the first stage RO concentrate is above the desired feed pressure for the NF array, a pressure let down valve may be provided in the feed conduit for the NF array such that the pressure may be reduced to the desired feed pressure. Alternatively, a control valve may be provided in the feed conduit for the NF array wherein the control valve regulates the flow of the first stage RO concentrate to the NF array and also lets down the pressure of the first stage RO concentrate to the desired feed pressure for the NF array. A booster pump may be provided on the feed conduit for the second RO stage to boost the pressure of the feed to a value at or above the minimum feed pressure for second RO stage. This would be necessary in the event that the pressure of the first stage RO concentrate is below the desired feed pressure for the second RO stage, in particular, is below the minimum operating pressure for the RO elements of the second RO stage.

Suitably, a back pressure valve is provided on the NF permeate flow line or combined NF permeate flow line upstream of the blend point for the NF permeate or combined NF permeate with the combined RO permeate. The back-pressure valve ensures that the pressure of the NF permeate or combined NF permeate is sufficiently above the pressure of the RO permeate to allow the NF permeate or combined NF permeate to be injected into the combined RO permeate to form the low salinity injection water. Suitably, the back-pressure valve opens when the pressure of the NF permeate or combined NF permeate exceeds a pre-set pressure and allows sufficient flow of NF permeate or combined NF permeate through the valve to maintain the pressure of the NF permeate at above the pre-set pressure. Typically, the pre-set pressure of the back-pressure valve is at least 5 psi higher than the pressure of the combined RO permeate. Generally, the pressure of the combined RO permeate, will be in the range of 10 to 75 psi absolute, preferably, 20 to 55 psi absolute.

The second RO stage of the membrane block optionally has a recirculation conduit configured to provide recirculation of at least a portion of the second stage concentrate from the second RO stage to the NF array. The recirculation conduit may be connected to the feed conduit for the NF array. A recirculation pump may be provided on the recirculation conduit to boost the pressure of the second stage RO concentrate. Depending on the pressure of the second stage RO concentrate, the recirculation conduit may be connected to the feed conduit for the NF array either upstream or downstream of the pressure-let down valve.

A further advantage of the desalination system of the present invention is that the first stage RO concentrate (a portion of which is used as feed to the NF array) has a higher total dissolved solids content and higher multivalent cation content than the feed water for the first RO stage resulting in an NF permeate with a higher total dissolved solids content and a higher multivalent cation content than if the feed water was divided to form an RO feed stream for the RO array and an NF feed stream for the NF array. Accordingly, a lower blend ratio of NF permeate to RO permeate (and hence a lower volumetric production capacity for the NF permeate) may be used to achieve the desired ionic composition (total dissolved solids, multivalent cation content and multivalent anion content) for the low salinity injection water stream.

Owing to the increased salinity of the first stage RO concentrate (compared with the salinity of the feed water to the first RO stage), it may be necessary to dose a scale inhibitor or mixture of scale inhibitors directly into the first stage RO concentrate to mitigate the risk of fouling of the RO elements of the second RO stage or of the NF elements of the NF array by mineral scales. Also, where a membrane block comprises a third RO stage, owing to the increased salinity of the second stage RO concentrate (compared with the salinity of the first stage RO concentrate), a scale inhibitor or mixture of scale inhibitors may be dosed into the second stage RO concentrate to mitigate the risk of fouling of the RO elements of the third RO stage. Similarly, where the NF array comprises a first and second NF stage, a scale inhibitor may be dosed into the first stage NF concentrate used as feed to the second NF stage as the first stage NF concentrate has a higher salinity than the feed to the NF array.

The feed water for the first RO stage of the membrane block may be a brackish water such as estuarine water, brackish aquifer water, or brackish produced water, a saline water such as seawater, saline aquifer water, saline produced water or a saline waste water, preferably seawater. Preferably, the feed water for the first RO stage has a total dissolved solids (TDS) content of at least 20,000 ppmv, more preferably a TDS in the range of 30,000 to 45,000 ppmv. Preferably, the feed water for the first RO stage of the membrane block has a sulfate anion concentration in the range of 1,000 to 4,000 ppmv, preferably, 1,500 to 4,000 ppmv, and a multivalent cation concentration in the range of 700 to 3,000 ppmv, preferably 1,000 to 3,000 ppmv, more preferably, 1,500 to 2,500 ppmv.

Preferably, the TDS of the first stage RO permeate is in the range of 50 to 225 ppmv, more preferably, 75 to 225 ppmv, most preferably, 100 to 200 ppmv, in particular, 100 to 150 ppmv.

Preferably, the sulfate anion concentration of the first stage RO permeate is in the range of 0.5 to 2.5 ppmv, in particular, 0.5 to 1.5 ppmv.

Preferably, the TDS of the second stage RO permeate is in the range of 200 to 350 ppmv, most preferably, 200 to 300 ppmv, in particular, 225 to 275 ppmv.

Preferably, the sulfate anion concentration of the second stage RO permeate is in the range of 4 to 7.5 ppmv, most preferably, 4.5 to 6.5 ppmv, in particular, 4.75 to 5.75 ppmv.

Preferably, the combined RO permeate has a TDS of less than 200 ppmv, preferably less than 150 ppmv.

Preferably, the TDS of the first stage RO concentrate is 20 to 35% higher, more preferably, 27.5 to 32.5% higher, in particular, about 30% higher than the TDS of the feed water for the first RO stage.

Typically, the TDS of the second stage RO concentrate is 20 to 35% higher than the TDS of the first stage RO concentrate.

Preferably, the NF permeate from a single stage NF array or blend of first stage NF permeate and second stage NF permeate from a two stage array (hereinafter referred to as "NF permeate produced by the NF array") has a TDS that is 20 to 35% higher, more preferably, 27.5 to 32.5% higher, in particular, about 30% higher than if the water used as feed to the first RO stage was also used as feed to the NF array. The NF permeate produced by the array also typically has a multivalent cation concentration that is 20 to 35% higher, more preferably, 27.5 to 32.5% higher, in particular, about 30% higher than the NF permeate that would otherwise be produced if the water used as feed to the first RO stage was also used as feed to the NF array. A higher multivalent cation concentration for the NF permeate is advantageous as this may mitigate the risk of formation damage arising from swelling or migration of clays.

Suitably, the NF membrane elements of the NF units are chosen to have:
(1) A high sulfate anion rejection of at least 98%, preferably at least 99.88% such that the NF permeate produced by the NF array has a low sulfate anion concentration of less than 40 ppmv thereby mitigating the risk of souring of the reservoir or of precipitation of mineral scales, for example, in production wells.
(2) A lower divalent cation rejection than sulfate anion rejection in the range of 70 to 80%, in particular, 75 to 77%, thereby allowing a portion of the divalent cations to pass across the membrane into the NF permeate which is advantageous as divalent cations are believed to reduce the risk of formation damage.
(3) A high passage of monovalent ions (both monovalent cations such as sodium and potassium cations and monovalent anions such as chloride and bromide anions). It is preferred that the NF membrane has at least 43% passage of NaCl (less than 57% rejection of NaCl). This minimizes the required operating pressure of the NF array and provides a high TDS NF permeate for use as a blending stream. A suitable NF membrane element is NANO SW™ supplied by Hydranautics.

Where the feed to the first RO stage has a TDS in the range of 30,000 to 45,000 ppmv, the NF permeate produced by the NF array typically has:
(i) a TDS in the range of 25,000 to 30,000;
(ii) a sulfate anion concentration of less than 40 ppmv; and
(iii) a multivalent cation concentration concentration in the range of 550 to 750 ppmv, in particular, 570 to 750 ppmv. Suitably, the NF permeate produced by the NF array has a divalent cation concentration in the range of 575 to 725 ppmv, in particular, 590 to 725 ppmv.

Typically, the second stage RO concentrate or third stage RO concentrate discharged from the RO array is at relatively high pressure (especially the second stage RO). Accordingly, prior to being discharged from the desalination system, the second or third stage RO concentrate may be passed through a hydraulic recovery unit, for example, a hydraulic recovery turbine or a turbocharger that may be coupled to one or more of the feed pump for the first RO stage, the optional booster pump for the first portion of first stage RO concentrate used as feed to the second RO stage or the optional recirculation pump for the second portion of the second stage RO concentrate recirculated to the NF array. For example, a shaft of the turbine may drive a shaft of one of the above identified pumps. These shafts may be connected via a gear system. Accordingly, the hydraulic recovery unit recovers energy from the second or third stage RO concentrate and uses this recovered energy to boost the pressure of one or more of the feed streams to the RO membrane stages or to the NF array thereby reducing the power requirements for the desalination system. However, typically, additional energy must be supplied to the feed pump or the optional booster pump or optional recirculation pump if the feed streams are to reach the required feed pressures. Typically, the pressure of the second or third stage RO concentrate downstream of the hydraulic recovery unit is less than 100 psig, preferably, in the range of 10 to 75 psig, in particular, 20 to 55 psig, for example, 10 to 50 psig.

Typically, the pressure of the NF concentrate discharged from the NF array (either from a single NF stage or from the second stage of a two stage NF array) is too low to warrant energy recovery. However, if desired energy may also be recovered from the NF concentrate using a hydraulic recovery unit.

The capacity of the desalination system should be sufficient to meet the low salinity injection water requirements for the oil reservoir. Typically, each block of the desalination system is capable of producing between 20,000 and 200,000 bbls of water per day, for example, 40,000 and 60,000 bbls of water per day of injection water having the desired low salinity, low multivalent cation concentration and low sulfate anion concentration.

Suitably, the pressure vessels of the filtration units for each stage of the desalination system are cylindrical having a length in the range of about 80 to 475 inches (2.0 to 12.1 metres), preferably 80 to 400 inches (2.0 to 10.2) metres. Suitably, the cylindrical pressure vessel has an internal diameter in the range of 4 to 20 inches (0.10 to 0.51 metres), for example, an internal diameter of 4, 6, 8, 9, or 16 inches (0.10, 0.15, 0.20, 0.23 and 0.41 metres).

The RO membrane elements contained in the pressure vessels of the RO stages and the NF membrane elements contained in the pressure vessels of the NF stage(s) are typically spiral wound elements, hollow fibre elements or tubular elements, preferably, spiral wound elements. Typically, each membrane element contained with the pressure vessel is cylindrical in shape and has a length in the range of 20 to 40 inches (0.51 to 1.02 metres) and an external diameter slightly smaller than the internal diameter of the cylindrical pressure vessel such that the membrane element is a tight fit in the pressure vessel.

Preferably, the first and second end caps of the pressure vessels are removable thereby allowing servicing and replacement of the RO or NF elements. A single set of membrane elements may be arranged in series within the pressure vessel in which case an inlet port for the feed water is located at or near one end of the pressure vessel. The feed water flows serially through all of the elements of the set and then exits as a concentrate through an outlet port located at or near the opposite end of the pressure vessel. A permeate may exit the pressure vessel via an outlet port located at one end of the pressure vessel or via first and second outlet ports arranged at first and second ends respectively of the pressure vessel. Typically the outlet port(s) for the permeate are located in one or both of the end caps of the pressure vessel.

Alternatively, the pressure vessel may have a central port with two sets of membrane elements arranged on either side of the central port with the lead elements of each set of membrane elements arranged at end positions in the pressure vessel. Preferably, each set of membrane elements comprises two to four membrane elements arranged in series, in particular, two or three membrane elements arranged in series. Feed water may enter the centre-ported pressure vessel via first and second feed ports arranged at or near the first and second ends respectively of the pressure vessel and flows serially through each set of membrane elements. Concentrate may be removed from the pressure vessel via the central port and permeate may be removed from the pressure vessel via first and second ends ports located at or near the first and second ends respectively of the pressure vessel. Preferably, the first and second permeate ports are located in the end caps of the pressure vessel.

It is advantageous to operate RO units with turbulent flow of feed water across the entire series of membrane elements as this minimizes the risk of concentration polarization (excessive salt concentration at the membrane surface). A particular advantage of a centre-ported RO vessel is that there is a lower pressure drop across each set of RO membrane elements compared with a non-centre ported design containing a single set of RO elements (assuming both types of RO vessels contain a similar number of similar sized RO elements). This means that the feed rate for the lead element of each set of elements of a centre-ported RO vessel may be lower than the feed rate for the lead element of the single set of elements of a non-centre ported vessel. For example, where a centre ported vessel contains two sets of three RO membrane elements, turbulent flow may be maintained in the last (third) element of each set of elements even when the flow rate to the lead element of each set is as low as 7 to 9 $m^3$/hour. In contrast, where six or seven RO elements (of the same size as used for the centre-ported vessel) are arranged in series in a non-centre ported vessel, the feed pressure to the lead element may need to be close to the maximum permitted flow rate for a lead element of 14 to 17 $m^3$/hour if turbulent flow is to be maintained in the last RO membrane element (sixth or seventh RO membrane element) in the series. Accordingly, the feed pressure for a centre-ported vessel is less constrained by the maximum permitted flow rate to a lead RO element than a non-centre ported vessel containing a similar number of RO elements.

The NF membrane units of the NF array may also comprise centre-ported vessels containing a set of NF membrane elements on either side of the centre port. However, it may be advantageous to use a traditional (non-centre ported) pressure vessel for the NF units and to arrange 6 or more NF membrane elements, for example, 6 to 12, preferably, 8 to 12 NF membrane element in series within the vessel thereby taking advantage of the pressure drop across the series of NF membranes, and the potential for increased levels of concentration polarization as the NF feed water moves through the series of membrane elements, particularly, in the membrane elements located in the fifth to twelfth positions in the series of elements. Concentration polarization would result in a poorer quality NF permeate (of higher TDS and higher multivalent cation concentration) than would be produced using a centre ported NF vessel containing a similar number of NF membrane elements of the same size. This would allow for a lower blend ratio of NF permeate to RO permeate when forming the low salinity injection water and hence permit a lower production capacity for the NF permeate.

Typically, each RO stage and NF stage comprise multiple pressure units arranged in parallel. Preferably, the first RO stage is larger (i.e. has more of the same size RO elements in the RO units, or alternatively stated has a larger RO surface area) than the second RO stage. Preferably, the ratio of RO elements in the first RO stage to the number of the RO elements of the second RO stage is in the range of 2:1 to 5:3 (where the RO elements in each stage are of the same size), or where a ratio of a surface area of the RO elements in the first RO stage to a surface area of the RO elements of the second RO stage is in the range of 2:1 to 5:3.

Typically, the first RO stage is larger than NF array. For example, a surface area of the RO elements in the first RO stage can be larger than a surface area of the NF elements in the NF array, or there can be more RO elements in the first RO stage than the number of NF elements in the NF array when the RO elements and NF elements have the same size. Preferably, a ratio of RO elements in the first RO stage to the number of NF elements in the NF array is in the range of 10:1 to 15:1 (where the RO elements and NF elements are of the same size).

Where the NF array is a two stage array, the first NF stage is larger than the second NF stage. Preferably, the ratio of the NF elements in the first NF stage to the number of NF elements in the second NF stage is in the range of 10:1 to 15:1 (where the NF elements are of the same size).

By "same size" of elements is meant that the elements have a similar membrane surface area.

Preferably, the RO units and NF units are arranged horizontally in rows stacked one above another (i.e., the longitudinal axes of the cylindrical pressure vessels are horizontally aligned) thereby reducing the footprint of the membrane block. Preferably, the NF units are arranged together, for example, in a single row. Where the RO units and NF units are horizontally stacked, it is preferred that the feed header, RO permeate header (for the combined RO permeate stream), RO concentrate header, NF permeate header (for the single NF permeate stream or combined NF permeate stream) and NF concentrate header are arranged vertically.

Typically, the desalination system is operated with pressure differentials across the RO stages and NF stage(s) of a membrane block that provides 40 to 60% by volume permeate recovery, preferably, 45 to 55% by volume permeate recovery, in particular, about 50% by volume permeate recovery (based on the volumetric flow rate of feed water to the first RO stage and the total volumetric flow rate of RO permeate and NF permeate produced by the membrane block). Operating the desalination system at these permeate recoveries increase the flow of feed water through the system to the second RO stage and to the NF stage(s). However, if the capacity of the desalination system was limited by the volumetric flow rate of feed water, it may be advantageous to operate the system at higher recoveries, for example, by increasing the pressure of the feed water.

Suitably, the NF array of at least one membrane block of the desalination system, may be isolated when there is less demand for NF permeate, for example, later in the life of a low salinity waterflood when increasing amounts of a saline produced water are available for blending with the permeate streams produced by the membrane block. Alternatively, the NF membranes elements of some or all of the NF units of at least one membrane block may be replaced with RO membrane elements when there is a greater demand for RO permeate and less demand for NF permeate owing to the availability of a saline produced water for blending with the permeate streams. In this scenario, the NF pressure vessels would need to be rated to the operating pressure for the RO membrane elements which is typically higher than the operating pressure for the NF elements.

The first stage RO permeate is of higher quality (lower TDS) than the second stage RO permeate removed from the second RO stage. Similarly, where there is a third RO stage, the second stage RO permeate is of higher quality (lower TDS) than the third RO permeate removed from the third stage. It is therefore preferred to operate the RO array with a higher permeate recovery from the first RO stage than the second RO stage. Where there is a third RO stage, it is preferred to operate the RO array with a higher permeate recovery from the first RO stage than the second RO stage and a higher permeate recovery from the second RO stage that the third RO stage.

The first RO stage of a membrane block may have recovery of RO permeate of 30 to 35% based on the volumetric flow rate of feed water to the first RO stage. The second RO stage may have a recovery of RO permeate of from 20 to 27.5% based on the volumetric flow rate of feed (first portion of first stage RO concentrate) to the second RO stage. The optional third RO stage may have a recovery of RO permeate of from 10 to 20% based on the volumetric flow of feed (second stage RO concentrate) to the third RO stage. The combined RO permeate may have a recovery of from 45 to about 52%, preferably about 47.5 to about 50% (based on the volumetric flow rate of feed water to the first RO stage).

Where the NF array comprises a single NF stage, the NF permeate recovery is typically in the range of 30 to 60%, preferably, 35 to 55% based on the volumetric flow rate of feed (second portion of first stage RO concentrate) to the NF stage. Where the NF array comprises a first and second NF stage, the first NF stage typically has a recovery of NF permeate of from 45 to 55% based on the volumetric flow rate of feed to the first NF stage while the second NF stage typically has a recovery of from 20 to 30% based on the volumetric flow rate of feed (first stage NF concentrate) to the second NF stage. The combined NF permeate from the first and second NF stages may have a recovery in the range of 65 to 75%, preferably, 70 to 75% based on the volumetric flow rate of the feed (second portion of first stage RO concentrate) to the first NF stage. Typically, the % recovery of NF permeate in the NF array is in the range of 3 to 5%, preferably, 3.25 to 3.75%, in particular, about 3.5%, based on the volumetric flow rate of feed water to the first RO stage.

The blend ratio of RO permeate (first stage RO permeate, second stage RO permeate and any third stage RO permeate) to NF permeate (NF permeate from a single stage NF array or combined NF permeate from a two stage NF array) is chosen to achieve a salinity for the low salinity injection water lying within an optimal salinity range for the oil-bearing reservoir that releases incremental oil while mitigating the risk of formation damage. The person skilled in the art will understand that the optimal salinity range may be determined from coreflood experiments and from permeability experiments performed using samples of reservoir rock taken from the reservoir and using a plurality of different compositions of low salinity injection water.

The blend ratio is dependent on:
(i) the ratio of the volumetric flow rates of the first portion of the first stage RO concentrate to the second RO stage and the second portion of first stage RO concentrate to the NF array;
(ii) the amount of any second stage RO concentrate recycled to the NF array;
(iii) the % recovery of RO permeate in each RO stage;
(iv) the % recovery of NF permeate in a single NF stage or the % recovery of NF permeate in each stage of a two stage NF array;

(v) any dumping of a portion of the combined RO permeate or the combined NF permeate to a body of water (upstream of the blend point for the low salinity injection water).

Typically, the ratio of the volumetric flow rate of the first portion of first stage RO concentrate (used as feed to the second RO stage) to the volumetric flow rate of the second portion of the first stage RO concentrate (used as feed to the NF array) is preferably in the range of 5:1 to 15:1, more preferably 7.5:1 to 12.5:1, in particular, 8:1 to 10:1.

Where a first portion of the second stage RO concentrate is used as feed to a third RO stage and a second portion of the second stage RO concentrate is recycled to the NF array, the volumetric flow rates of the first and second portions of the second stage RO concentrate are approximately equal, for example, are in the range of 0.75:1 to 1.25:1, in particular, about 1:1.

Where there is a three stage RO array and the second stage RO concentrate is used as feed to the third RO stage and as feed to the NF array, the volumetric flow rate of the second stage RO concentrate to the third RO stage and to the NF array may be limited by the operating pressure of the third RO stage and of the NF array and the requirement for controlling scaling (deposition of mineral scales) in the third RO stage and in the NF array.

Typically, the volumetric ratio in which RO permeate is blended with NF permeate to form the low salinity injection water stream is in the range of 2:1 to 40:1, preferably, 4:1 to 27:1, in particular, 10:1 to 25:1 to provide an injection water having a total dissolved solids content in the range of 500 to 5,000 ppm, preferably, 1,000 to 5,000 ppm, and a sulfate anion concentration of less than 10 ppm, preferably, less than 5 ppm.

Optionally, a produced water may be blended with the RO permeate and NF permeate to produce the low salinity injection water, in which case, the volumetric amount of NF permeate in the blended stream may need to be reduced.

Blending the RO permeate and NF permeate on an individual membrane block is advantageous as this reduces hydraulic delay upon changing the blend ratio of the NF and RO permeates (for example, in response to increasing availability of produced water for blending or changes in the quality of the produced water for blending such as changing TDS or changing concentrations of individual ions in the produced water). Hydraulic delay arises from the volume of fluid in the conduits (e.g. NF permeate lines, NF headers, RO permeate lines and RO headers) upstream of the blending point for the RO permeate, NF permeate and the produced water.

Preferably, the feed water to the first RO stage may have undergone at least one process of:
 i. filtration to remove particulate matter;
 ii. chlorine scavenging;
 iii. dosing with a biocide;
 iv. deaeration; and,
 v. dosing with a scale inhibitor.

As an alternative to deaerating the source water upstream of the desalination system, it is envisaged that a deaerator may be provided downstream of the desalination system in order to control corrosion in the injection lines, injection pumps and injection wells. An advantage of providing a downstream deaerator is that the volume of water that is deaerated is substantially less than if the deaerator was arranged upstream of the desalination system. Then again, having a deaerator upstream of the desalination system reduces the risk of corrosion within the desalination system and therefore allows for the use of cheaper steels.

The capacity of the desalination system should be sufficient to meet the low salinity injection water requirements for the oil reservoir. Typically, each bank of the desalination system may be capable of producing between 20,000 and 200,000 bbls of water per day, for example, 40,000 and 60,000 bbls of water per day of the desired low salinity and desired low sulfate anion concentration.

The invention will now be illustrated by reference to the following Figures.

Figure 1:
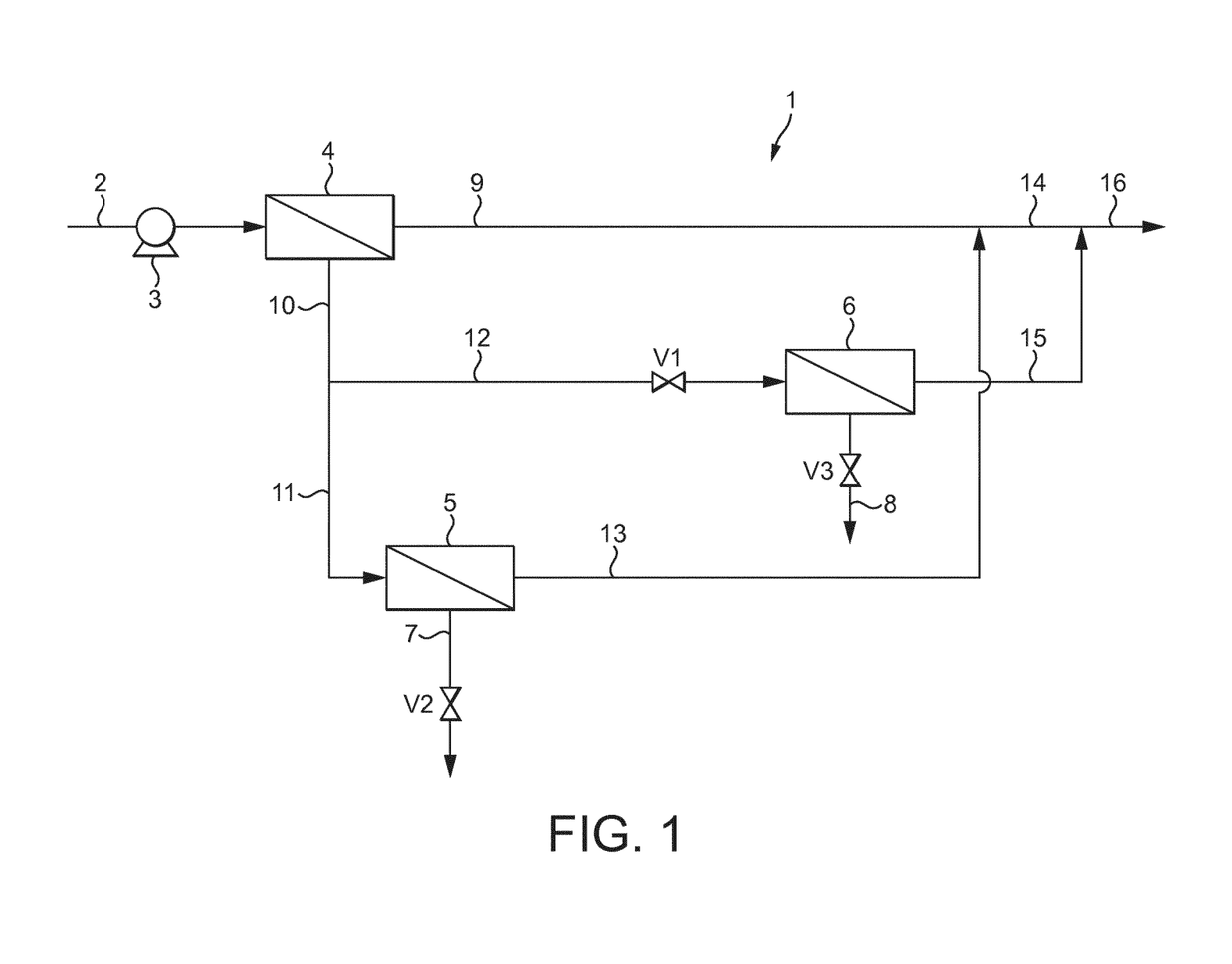
FIG. 1 is a schematic process flow diagram of a first desalination system according to the present invention.

FIG. 1 shows a membrane block 1 of a desalination system for treating a feed water 2. The membrane block 1 has a feed pump 3, a first RO stage 4, a second RO stage 5, and a single NF stage 6. Each RO stage comprises a plurality of RO units. The NF stage comprises a plurality of NF units. Typically, the second RO stage has fewer RO units than the first RO stage.

The membrane block 1 has valves V1 to V3 and various conduits configured to provide the flow paths described below. Valves V1 to V3 may move between fully opened and fully closed positions. However, in an embodiment of the invention, valves V2 and V3 are throttle valves that may be set to various intermediate positions while valve V1 is a pressure let-down valve. The flows and pressures through the membrane block may be controlled by the feed pump 3, valves V1, V2, or V3 or any combination thereof.

In the configuration of FIG. 1, feed pump 3 pumps feed water 2 to the first RO stage 4 where the feed water is separated into a first stage RO permeate 9 and a first stage RO concentrate 10. The first stage RO concentrate 10 is divided at a branch point to form a feed 11 for the second RO stage 5 and a feed 12 for the NF stage 6. The flows and pressures through the membrane block may be adjusted so that the pressure of feed 11 matches the operating pressure of the second RO stage. The pressure of the feed 12 to the NF stage may be adjusted using a pressure let-down valve V1 to match the operating pressure of the NF stage. If necessary, the pressure of the feed 11 for the second RO stage 5 may be increased using a booster pump (not shown) to above the minimum operating pressure of the second RO stage 5. Alternatively, a back-pressure valve (not shown) may be located on the conduit for the first stage RO permeate 9 to increase the pressure of the first stage RO concentrate 10 to above the minimum operating pressure of the second RO stage 5.

The second RO stage 5 separates the feed 11 into a second stage RO permeate 13 and a second stage RO concentrate 7 that is discharged from the membrane block. Thus, valve V2 is at least partially open to provide a bleed of RO concentrate 7. The second stage RO permeate 13 is then combined with the first stage RO permeate 9 to form a combined RO permeate stream 14. The NF stage separates feed 12 into an NF permeate 15 and an NF concentrate 8 that is discharged from the membrane block. Thus, valve V3 is at least partially open to provide a bleed of NF concentrate 8. The NF permeate 15 is then injected into the combined RO permeate 14 to form a low salinity water injection stream 16.

Figure 2:
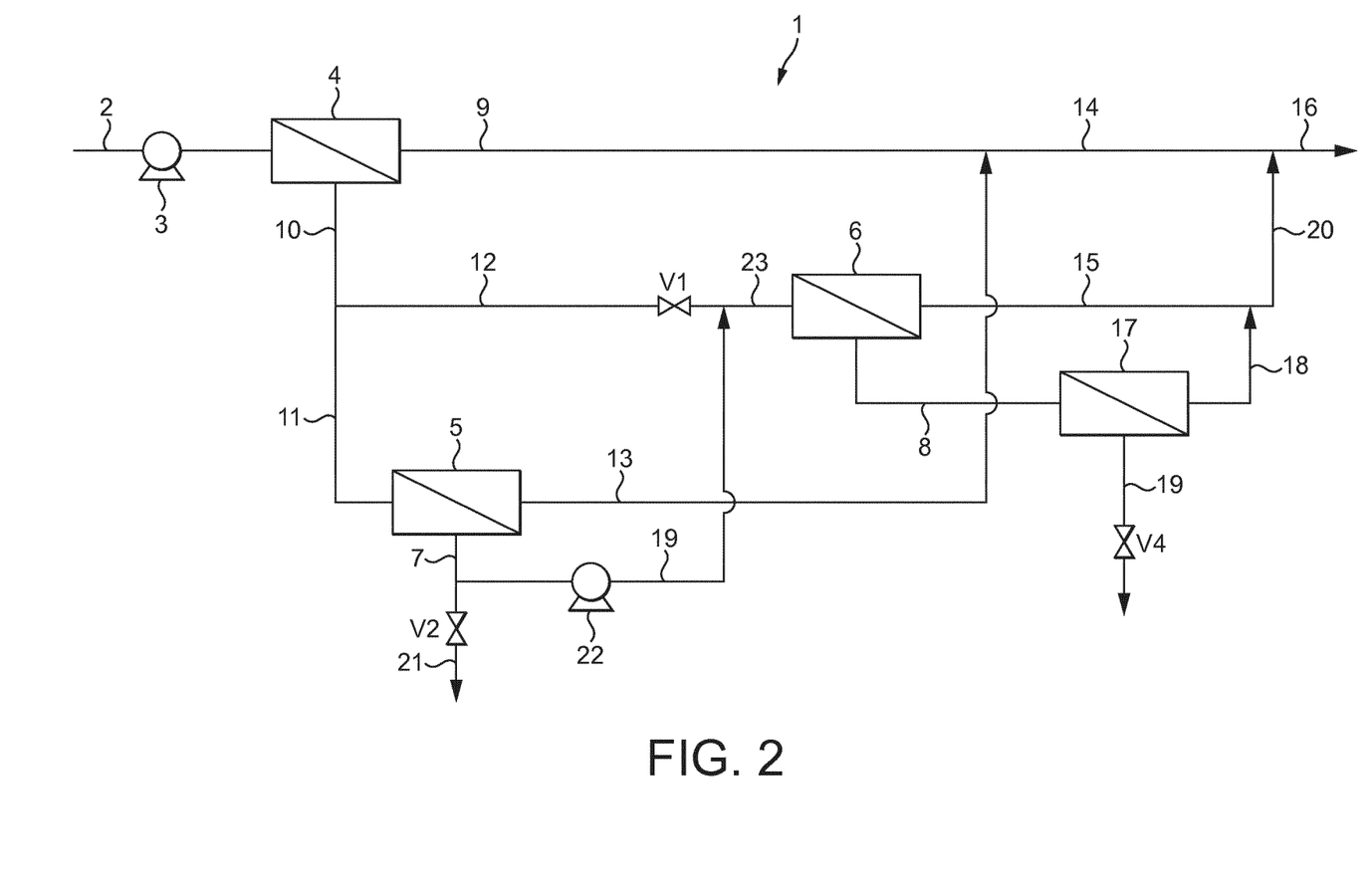
FIG. 2 is a schematic process flow diagram of a second desalination system according to the present invention.

FIG. 2 relates to a modified membrane block of the desalination system of FIG. 1 having a first NF stage 6 and a second NF stage 17. In addition, the second stage RO concentrate 7 is divided at a branch point to form an RO concentrate recycle stream 19 and an RO concentrate bleed stream 21. Valve V2 is at least partially open so that the RO concentrate bleed stream 21 is discharged from the membrane block 1. The RO concentrate recycle stream 19 is then injected into feed stream 12 to form a combined feed stream 23 for the first NF stage 6. Where the second stage RO concentrate 7 has a pressure below the minimum operating pressure for the first NF stage, the RO concentrate recycle stream 19 is boosted in pressure using booster pump 22 before being combined with feed stream 12.

The second NF stage 17 separates the NF concentrate 8 from the first NF stage 6 into a second stage NF permeate 18 and a second stage RO concentrate 19 that is discharged from the membrane block. Thus, valve V4 is at least partially open to provide a bleed of RO concentrate 19. The second stage NF permeate 18 is then combined with the first stage NF permeate 15 to form a combined NF permeate 20. The combined NF permeate 20 is then injected into the combined RO permeate 14 to form the low salinity water injection stream 16.

The person skilled in the art would understand that the desalination systems of FIGS. 1 and 2 could be adapted to include a third RO stage which receives the second stage RO concentrate as feed. The third RO stage would separate the second stage RO concentrate to form a third stage RO permeate that is blended with the first and second stage RO permeates and an RO concentrate (RO brine) that is discharged from the system.

From the description included herein as well as the embodiments illustrated with respect to FIG. 1 and FIG. 2, it can be seen that a single source of feed water can be processed using a plurality of RO stages and one or more NF stages where the concentrate (e.g., the retentate) from the first RO stage is used as the feed for one or more additional RO stages and the one or more NF stages. The resulting permeate streams can be combined to form a single low salinity injection water stream for use with an injection well.

The invention claimed is:

1. A desalination system comprising:
    a feed line;
    a first RO stage having a first RO stage inlet, a first RO stage RO permeate outlet, and a first RO stage RO concentrate outlet;
    a second RO stage having a second RO stage inlet, a second RO stage RO permeate outlet, and a second RO stage RO concentrate outlet;
    an NF stage having an NF stage inlet, an NF stage NF permeate outlet, and an NF stage NF concentrate outlet; and
    a set of conduits that:
        (a) connect the feed line to the first RO stage inlet;
        (b) connect the first RO stage RO concentrate outlet to: (i) the second RO stage inlet, and (ii) the NF stage inlet;
        (c) combine: (i) the first RO stage RO permeate outlet, (ii) the second RO stage RO permeate outlet, and (iii) the NF stage NF permeate outlet to form a low salinity injection water; and
        (d) connect the low salinity injection water either directly or indirectly to a low salinity water injection line for injection in an oil-bearing reservoir,
    wherein the first RO stage and the second RO stage each comprise a group of RO filtration units arranged in parallel, wherein each of the RO filtration units comprises a pressure vessel containing one or more filtration elements, wherein the one or more filtration elements consist of RO filtration elements, and wherein the NF stage comprises a group of NF filtration units arranged in parallel, wherein each of the NF filtration units comprises a pressure vessel containing one or more filtration elements, where the one or more filtration elements consist of NF elements; and
    wherein the second RO stage RO concentrate outlet line and the NF stage NF concentrate outlet line are dump lines that discharge the second RO stage RO concentrate and the NF stage NF concentrate, respectively, from the desalination system.

2. The system of claim 1, wherein the set of conduits comprises a concentrate conduit that connects the second RO stage RO concentrate outlet with the NF stage inlet and wherein a recirculation pump is located on the concentrate conduit.

3. The system of claim 1, further comprising:
    a third RO stage having a third RO stage inlet, a third RO stage RO permeate outlet, and a third RO stage RO concentrate outlet,
    wherein the set of conduits is further adapted to: (i) connect the second RO stage RO concentrate outlet to the third RO stage inlet, and (ii) connect the third RO stage RO permeate outlet either directly or indirectly to the low salinity water injection line.

4. The system of any one of the preceding claims, further comprising:
    the NF stage and a second NF stage, wherein the NF stage has the NF stage inlet, the NF stage NF permeate outlet, and the NF stage NF concentrate outlet and the second NF stage has a second NF stage inlet, a second NF stage NF permeate outlet, and a second NF stage NF concentrate outlet,
    wherein the set of conduits is further adapted to: (i) connect the NF stage NF concentrate outlet to the second NF stage inlet, and (ii) connect the second NF stage NF permeate outlet either directly or indirectly to the low salinity water injection line.

5. The system of any one of claims 1-3, wherein the first RO stage has more RO elements than the second RO stage, or wherein the first RO stage has a greater RO surface area than a surface area of the second RO stage.

6. The system of claim 5 wherein a ratio of the number of RO elements in the first RO stage to the number of RO elements in the second RO stage is in the range of from 2:1 to 5:3.

7. The system of any one of claims 1-3, wherein a ratio of the number of RO elements in the first RO stage to the number of elements in the NF stage(s) is in the range of from 10:1 to 15:1.

8. A process for treating a feed water to produce a low salinity injection water for injection into an oil-bearing reservoir, the method comprising the steps of:
    flowing a feed water through a first stage of reverse osmosis (RO) filtration to produce a first stage RO permeate and a first stage RO concentrate;
    flowing a first portion of the RO concentrate through a second stage of RO filtration to produce a second stage RO permeate and a second stage RO concentrate;
    flowing a second portion of the first stage RO concentrate through a first stage of nanofiltration (NF) to produce a first stage NF permeate and a first stage NF concentrate; and
    combining the first stage RO permeate, second stage RO permeate, and the first stage NF permeate to form a low salinity injection water stream,
    wherein the first stage of RO filtration and the second stage of RO filtration each comprise a group of RO filtration units arranged in parallel, wherein each of the RO filtration units comprises a pressure vessel containing one or more filtration elements, wherein the one or more filtration elements consist of RO filtration elements, and wherein the NF stage comprises a group of NF filtration units arranged in parallel, wherein each of the NF filtration units comprises a pressure vessel containing one or more filtration elements, wherein the one or more filtration elements consist of NF elements; and wherein a second stage RO concentrate outlet line and an NF stage NF concentrate outlet line are dump lines are configured for discharging the second stage RO concentrate and the first stage NF concentrate, respectively.

9. A process as claimed in claim 8, further comprising: discharging the second stage RO concentrate and the first stage NF concentrate to a body of water.

10. A process as claimed in claim 8, further comprising: flowing the first stage NF concentrate through a second stage of nanofiltration to form a second stage NF permeate and a second stage NF concentrate; and combining the first stage NF permeate and the second stage NF permeate with the first stage RO permeate and the second stage RO permeate to form the low salinity injection water stream.

11. A process as claimed in claim 10, further comprising: discharging the second stage RO concentrate and the second stage NF concentrate to a body of water.

12. A process as claimed in claim 8 or 10, further comprising:

flowing a first portion of the second stage RO concentrate through a third stage of RO filtration to form a third stage RO permeate and a third stage RO concentrate;

combining a second portion of the second stage RO concentrate with the second portion of the first stage RO concentrate to form a combined RO concentrate;

flowing the combined RO concentrate through the NF stage(s); and discharging the third stage RO concentrate to a body of water.

13. A process as claimed in any one of claims 8 to 10, wherein a recovery rate of the feed water in the low salinity injection water is 60 percent or more based on the volumetric flow rate of the feed water to the first RO stage.

14. A process as claimed in any one of claims 8 to 10, wherein an oil-bearing reservoir is penetrated by an injection well and a production well, and wherein the method further comprises:

injecting the low salinity injection water stream into the oil-bearing reservoir from the injection well.

15. A process as claimed in claim 14, further comprising:

sweeping oil through the reservoir towards the production well using the injected low salinity injection water, and optionally, a subsequently injected drive water; and recovering the oil from the oil-bearing reservoir via the production well.

\* \* \* \* \*